US012568149B2

(12) United States Patent
Rajagopalan et al.

(10) Patent No.: US 12,568,149 B2
(45) Date of Patent: Mar. 3, 2026

(54) DYNAMIC PLACEMENT OF SERVICES CLOSER TO ENDPOINT

(71) Applicant: DELL PRODUCTS L.P., Round Rock, TX (US)

(72) Inventors: Balaji Rajagopalan, Sunnyvale, CA (US); Pawan Kumar Singal, Milpitas, CA (US); Ning Zhuang, San Jose, CA (US); Balasubramanian Muthukrishnan, Bangalore (IN); Baskaran Jeyapaul, Santa Clara, CA (US); Charles Park, San Jose, CA (US)

(73) Assignee: DELL PRODUCTS L.P., Round Rock, TX (US)

( * ) Notice: Subject to any disclaimer, the term of this patent is extended or adjusted under 35 U.S.C. 154(b) by 87 days.

(21) Appl. No.: 17/870,351

(22) Filed: Jul. 21, 2022

(65) Prior Publication Data

US 2024/0031446 A1     Jan. 25, 2024

(51) Int. Cl.
*H04L 67/51* (2022.01)
*H04L 12/46* (2006.01)
*H04L 49/354* (2022.01)
*H04L 61/4511* (2022.01)
*H04L 67/141* (2022.01)

(52) U.S. Cl.
CPC .......... *H04L 67/51* (2022.05); *H04L 12/4679* (2013.01); *H04L 49/354* (2013.01); *H04L 61/4511* (2022.05); *H04L 67/141* (2013.01)

(58) Field of Classification Search
None
See application file for complete search history.

(56) References Cited

U.S. PATENT DOCUMENTS

| 10,606,454 | B2 | 3/2020 | Pani |
| 11,218,378 | B1 | 1/2022 | Chaganti |
| 11,442,652 | B1 | 9/2022 | Dailey |
| 11,469,958 | B1 | 10/2022 | Mackie |
| 11,489,723 | B2 | 11/2022 | Smith |
| 11,543,966 | B1 | 1/2023 | Varghese |
| 11,550,734 | B1 | 1/2023 | Matosevich |
| 12,026,402 | B2 | 7/2024 | Paulchamy et al. |
| 2009/0083390 | A1 | 3/2009 | Abu-Ghazaleh |

(Continued)

OTHER PUBLICATIONS

Notice of Allowance and Fee(s) Due, Received Mar. 22, 2024, in the related matter, U.S. Appl. No. 17/869,727. (9pgs).

(Continued)

*Primary Examiner* — Lance Leonard Barry
(74) *Attorney, Agent, or Firm* — BAUGH LAW, LLC

(57) ABSTRACT

In a network fabric, such as a network having CLOS topology, non-volatile memory express (NVMe®) endpoints may be connected to one of centralized discovery controller (CDC) distributed services placed among multiple leaf switches, which may have resource constraints. Connection scale, delay, and jitter may occur if the CDC distributed services are not placed on leaf switches close to NVMe endpoints served by the CDC distributed services. System and method embodiments are disclosed for placement of CDC services on a switching network fabric close to endpoints that are served by the CDC services. The CDC services may be placed on desired leaf switches close to endpoints.

20 Claims, 10 Drawing Sheets

(56) References Cited

U.S. PATENT DOCUMENTS

| | | | |
|---|---|---|---|
| 2009/0144720 A1 | 6/2009 | Roush | |
| 2011/0167466 A1 | 7/2011 | Aiouaz | |
| 2013/0067049 A1 | 3/2013 | Ghosh | |
| 2014/0156667 A1* | 6/2014 | Kapadia | G06F 16/901 |
| | | | 707/741 |
| 2014/0198686 A1 | 7/2014 | Kamble | |
| 2015/0124644 A1 | 5/2015 | Pani | |
| 2016/0149776 A1* | 5/2016 | Pani | H04L 41/142 |
| | | | 709/224 |
| 2017/0315522 A1* | 11/2017 | Kwon | G05B 17/02 |
| 2018/0011699 A1 | 1/2018 | Manthiramoorthy | |
| 2018/0074717 A1 | 3/2018 | Olarig | |
| 2018/0074984 A1 | 3/2018 | Olarig | |
| 2018/0227182 A1 | 8/2018 | Patton | |
| 2018/0241617 A1 | 8/2018 | Radzikowski | |
| 2018/0246731 A1 | 8/2018 | Regmi | |
| 2018/0270119 A1 | 9/2018 | Ballapuram | |
| 2018/0375825 A1 | 12/2018 | Nataraja | |
| 2019/0037033 A1* | 1/2019 | Khakimov | H04L 47/20 |
| 2019/0042144 A1 | 2/2019 | Peterson | |
| 2019/0245924 A1 | 8/2019 | Li | |
| 2020/0065269 A1 | 2/2020 | Balasubramani et al. | |
| 2020/0081640 A1 | 3/2020 | Enz et al. | |
| 2020/0136996 A1 | 4/2020 | Li | |
| 2020/0293180 A1 | 9/2020 | Pani | |
| 2020/0310657 A1 | 10/2020 | Cayton et al. | |
| 2020/0319812 A1 | 10/2020 | He et al. | |
| 2020/0349094 A1 | 11/2020 | Smith et al. | |
| 2020/0396126 A1 | 12/2020 | L'Ecuyer | |
| 2020/0409893 A1 | 12/2020 | Puttagunta | |
| 2021/0019272 A1 | 1/2021 | Olarig et al. | |
| 2021/0028987 A1 | 1/2021 | Krivenok | |
| 2021/0042160 A1 | 2/2021 | Alamouti | |
| 2021/0055947 A1 | 2/2021 | Mahajan | |
| 2021/0064281 A1 | 3/2021 | Satapathy et al. | |
| 2021/0124695 A1 | 4/2021 | Jaiswal et al. | |
| 2021/0126861 A1 | 4/2021 | Rajendiran et al. | |
| 2021/0157692 A1 | 5/2021 | MacCarthaigh | |
| 2021/0286540 A1 | 9/2021 | Tylik | |
| 2021/0286741 A1 | 9/2021 | Smith | |
| 2021/0288878 A1 | 9/2021 | Smith | |
| 2021/0289027 A1 | 9/2021 | Smith | |
| 2021/0289029 A1 | 9/2021 | Smith | |
| 2021/0311899 A1 | 10/2021 | Smith | |
| 2021/0360426 A1 | 11/2021 | Kumar | |
| 2021/0397351 A1 | 12/2021 | Dhatchinamoorthy | |
| 2022/0014435 A1 | 1/2022 | Vadapalli | |
| 2022/0030062 A1 | 1/2022 | Jennings | |
| 2022/0066799 A1 | 3/2022 | Pinto | |
| 2022/0286377 A1 | 9/2022 | Smith | |
| 2022/0286508 A1 | 9/2022 | Smith | |
| 2023/0035799 A1 | 2/2023 | Desanti | |
| 2023/0305700 A1 | 9/2023 | Desanti | |
| 2023/0325200 A1 | 10/2023 | Desanti | |
| 2024/0022472 A1 | 1/2024 | Krishnamurthy et al. | |
| 2024/0031221 A1 | 1/2024 | Rajagopalan et al. | |

OTHER PUBLICATIONS

Office Action received Nov. 9, 2023, in the related matter, U.S. Appl. No. 17/863,300. (18pgs).

"Deploying Docker containers to a Cisco Catalyst 9300 with Cisco DNACenter," [online], [Retrieved Mar. 7, 2024]. Retrieved from Internet <URL:https://ccie.tv/> Cisco, 2021. (13p).

Non-Final Office Action Response filed Mar. 6, 2024, in the related matter, U.S. Appl. No. 17/869,727. (12pgs).

Non-Final Office Action, mailed Jun. 27, 2023, in related matter U.S. Appl. No. 17/863,798. (18pgs).

Notice of Allowance and Fee(s) Due, Received Jul. 17, 2024, in the related matter, U.S. Appl. No. 17/869,727. (5pgs).

Non-Final Office Action Received Dec. 7, 2023, in the related matter, U.S. Appl. No. 17/869,727. (9pgs).

Response to Non-Final Office Action, filed Sep. 27, 2023, in related matter U.S. Appl. No. 17/863,798. (13pgs).

Response filed Jun. 24, 2024 in realed U.S. Appl. No. 17/863,798. (15pgs).

"NVM ExpressTM over Fabrics Revision 1.1," [online], [Retrieved May 7, 2021] Retrieved from Internet <URL:https://nvmexpress.org/wp-content/uploads/NVMe-over-Fabrics-1.1-2019.10.22-Ratified.pdf> (83pgs).

Notice of Allowance and Fee(s) Due, mailed Sep. 25, 2024, in the related matter U.S. Appl. No. 17/863,798. (7pgs).

Notice of Allowance and Fee(s) Due, mailed Nov. 21, 2024, in the related matter U.S. Appl. No. 17/869,727. (7pgs).

Non-Final Office Action, mailed Mar. 28, 2024, in related matter U.S. Appl. No. 17/863,798. (12pgs).

Notice of Allowance and Fee(s) Due, Received Nov. 21, 2024, in the related matter, U.S. Appl. No. 17/869,727. (7pgs).

Response filed Sep. 27, 2023, in related matter U.S. Appl. No. 17/863,798. (13 pgs).

"FC and FCOE versus iSCSI—"Network-centric" versus "End-Node-centric" provisioning," [online], [Retrieved Oct. 12, 2020]. Retrieved from Internet (6pgs).

"Hard zoning versus soft zoning in a FC/FCoE SAN," [online], [Retrieved Oct. 12, 2020] Retrieved from Internet (5pgs).

"NVM Express Base Specification," revision 1.4, Jun. 10, 2019, [online], [Retrieved Oct. 12, 2020] Retrieved from Internet (403pgs).

"NVM Express Over Fabrics," revision 1.0, ratified May 31, 2016, [online], [Retrieved Oct. 12, 2020] Retrieved from Internet (49pgs).

"NVMe over Fabrics' Discovery problem," [online], [Retrieved Oct. 12, 2020] Retrieved from Internet (2pgs).

Notice of Allowance and Fee(s) Due, Mailed Apr. 9, 2025, U.S. Appl. No. 17/869,727. (12pgs).

* cited by examiner

300

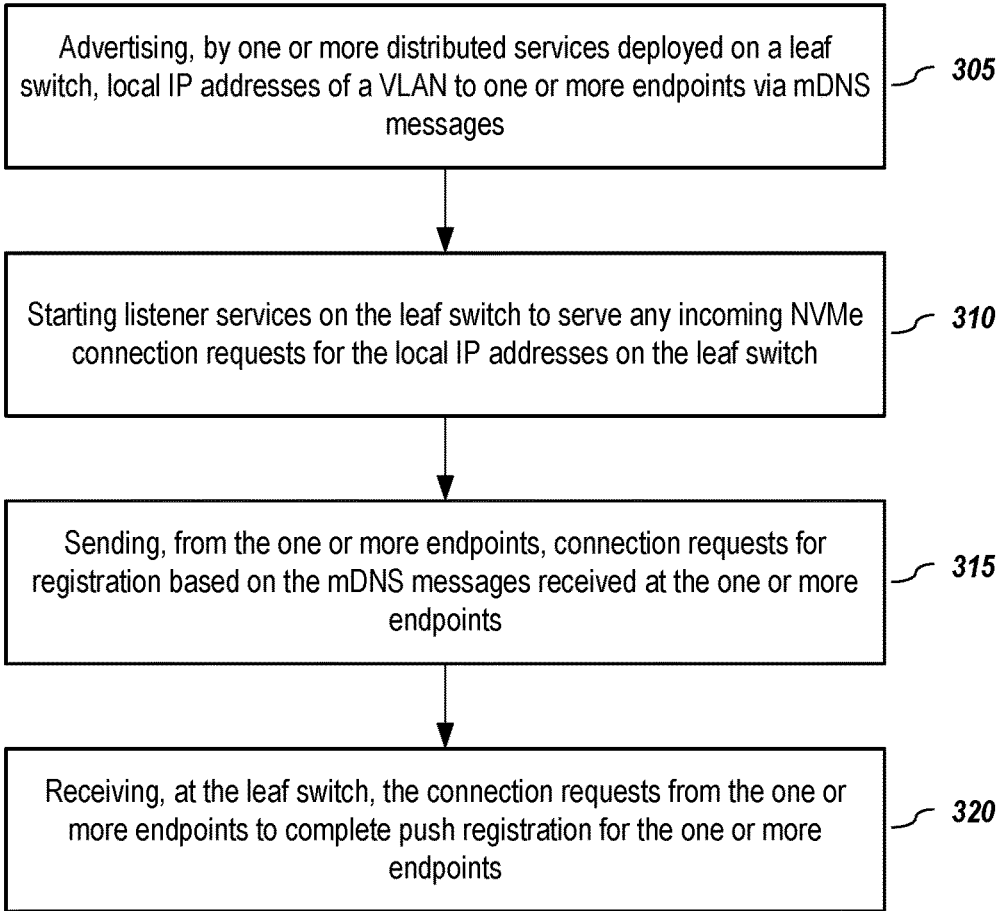

Advertising, by one or more distributed services deployed on a leaf switch, local IP addresses of a VLAN to one or more endpoints via mDNS messages ⌐ 305

Starting listener services on the leaf switch to serve any incoming NVMe connection requests for the local IP addresses on the leaf switch ⌐ 310

Sending, from the one or more endpoints, connection requests for registration based on the mDNS messages received at the one or more endpoints ⌐ 315

Receiving, at the leaf switch, the connection requests from the one or more endpoints to complete push registration for the one or more endpoints ⌐ 320

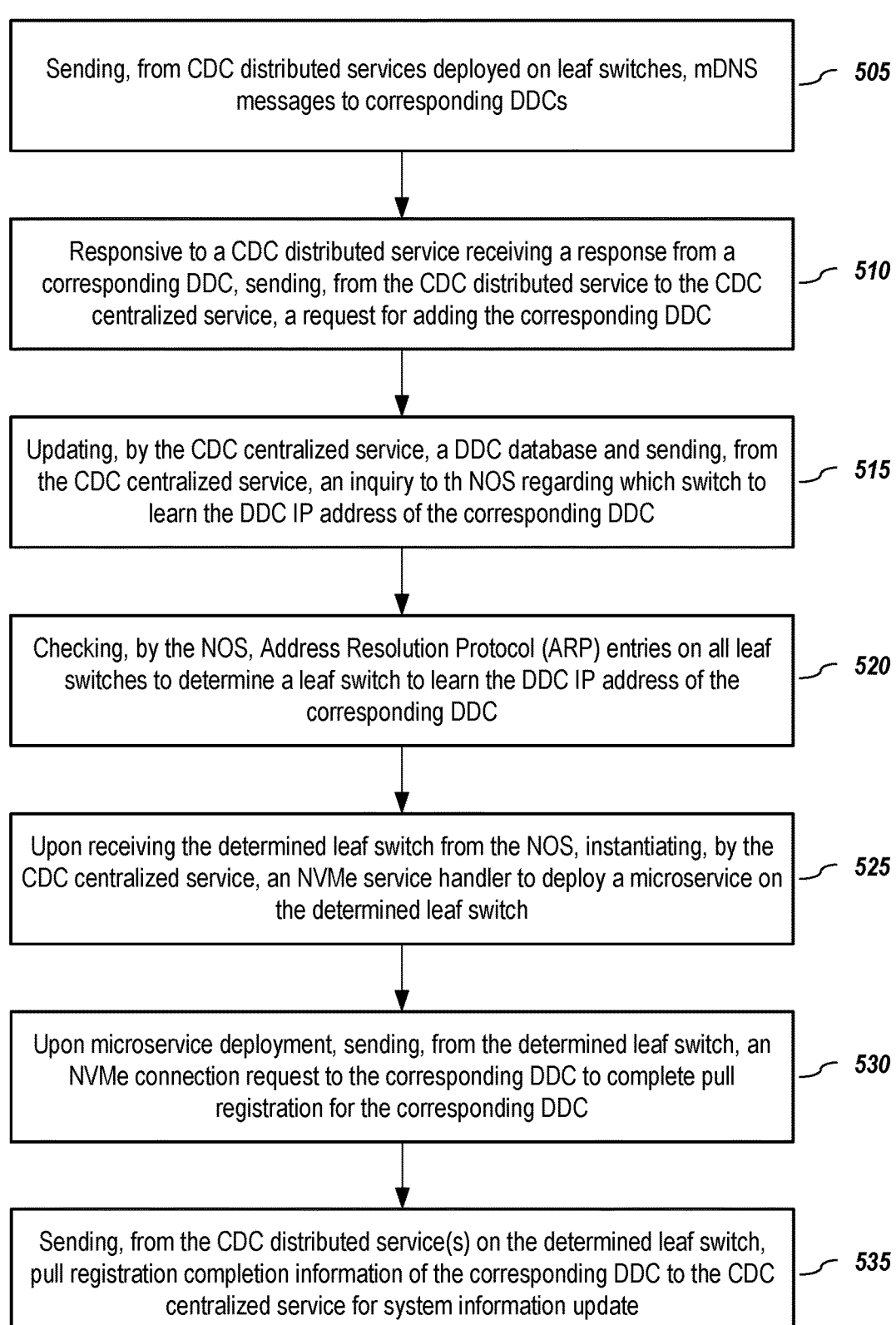

Sending, from CDC distributed services deployed on leaf switches, mDNS messages to corresponding DDCs ⟍ 505

Responsive to a CDC distributed service receiving a response from a corresponding DDC, sending, from the CDC distributed service to the CDC centralized service, a request for adding the corresponding DDC ⟍ 510

Updating, by the CDC centralized service, a DDC database and sending, from the CDC centralized service, an inquiry to th NOS regarding which switch to learn the DDC IP address of the corresponding DDC ⟍ 515

Checking, by the NOS, Address Resolution Protocol (ARP) entries on all leaf switches to determine a leaf switch to learn the DDC IP address of the corresponding DDC ⟍ 520

Upon receiving the determined leaf switch from the NOS, instantiating, by the CDC centralized service, an NVMe service handler to deploy a microservice on the determined leaf switch ⟍ 525

Upon microservice deployment, sending, from the determined leaf switch, an NVMe connection request to the corresponding DDC to complete pull registration for the corresponding DDC ⟍ 530

Sending, from the CDC distributed service(s) on the determined leaf switch, pull registration completion information of the corresponding DDC to the CDC centralized service for system information update ⟍ 535

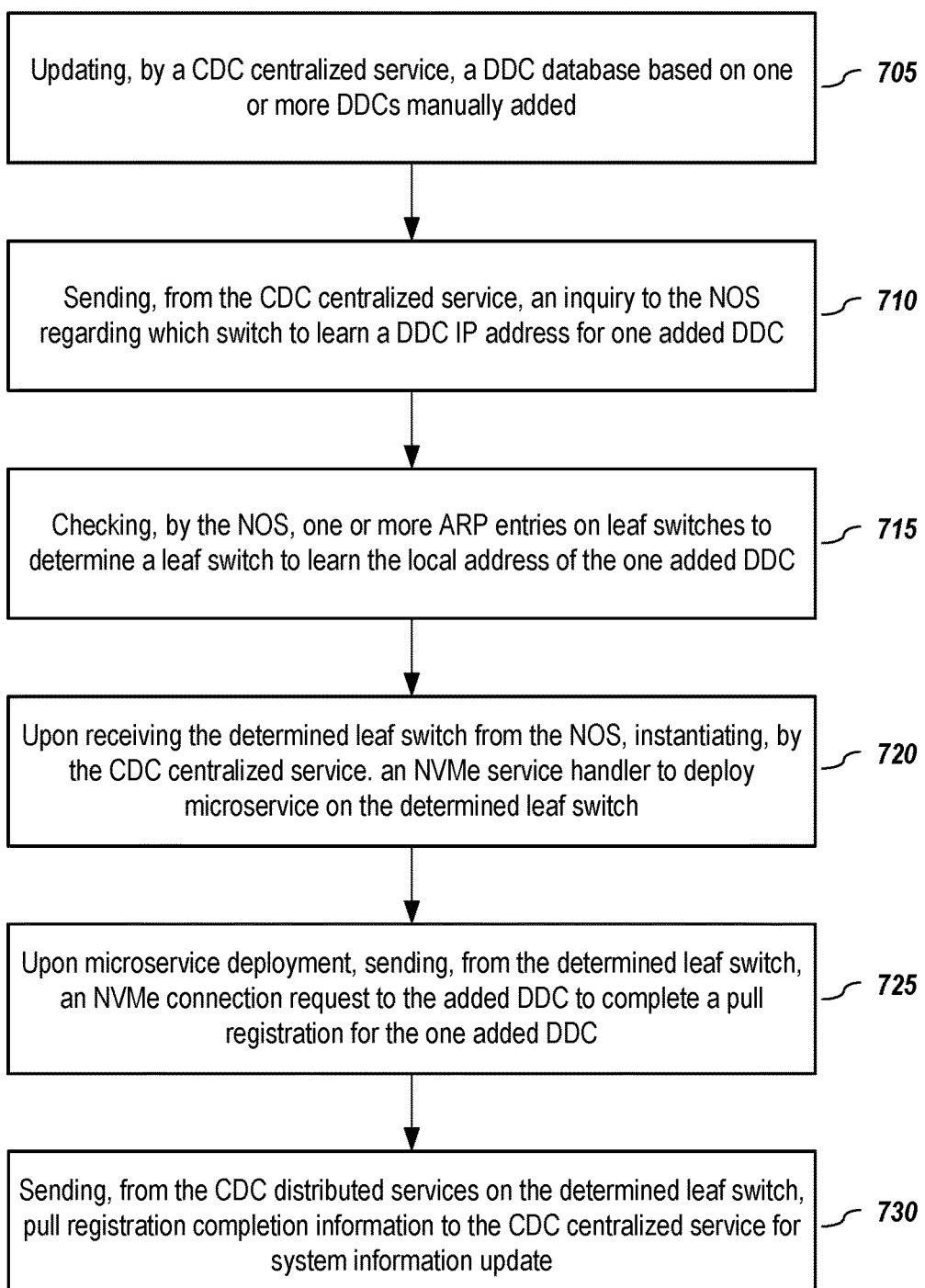

Updating, by a CDC centralized service, a DDC database based on one or more DDCs manually added    ⟋ 705

Sending, from the CDC centralized service, an inquiry to the NOS regarding which switch to learn a DDC IP address for one added DDC    ⟋ 710

Checking, by the NOS, one or more ARP entries on leaf switches to determine a leaf switch to learn the local address of the one added DDC    ⟋ 715

Upon receiving the determined leaf switch from the NOS, instantiating, by the CDC centralized service. an NVMe service handler to deploy microservice on the determined leaf switch    ⟋ 720

Upon microservice deployment, sending, from the determined leaf switch, an NVMe connection request to the added DDC to complete a pull registration for the one added DDC    ⟋ 725

Sending, from the CDC distributed services on the determined leaf switch, pull registration completion information to the CDC centralized service for system information update    ⟋ 730

DYNAMIC PLACEMENT OF SERVICES CLOSER TO ENDPOINT

BACKGROUND

A. Technical Field

The present disclosure relates generally to information handling systems. More particularly, the present disclosure relates to systems and methods for dynamic placement of services in a network closer to endpoints of the network.

B. Background

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In a network fabric, such as a network fabric with a CLOS topology, non-volatile memory express (NVMe) over Fabrics (NVMe-OF™) endpoints are connected to centralized discovery controller or service (CDC) server, which may be placed on one of multiple leaf switches in the network fabric, and may have resource constraints. When a CDC service is placed on a leaf switch to serve an NVMe® endpoint far away, the service to the NVMe® endpoint may suffer excessive latency, delay, jitter, or even timeout, and the performance of the whole network fabric may be impacted negatively.

Accordingly, it is highly desirable to find new, more efficient ways to place the leaf switches closest to NVMe® endpoints to which the CDC services connect for a predictable behavior with respect to connection scale, latency, and jitter.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

FIG. 3 depicts a process for push registration on a network fabric for NVMe® endpoints, according to embodiments of the present disclosure.

FIG. 5 depicts a process for pull registration on a network fabric for NVMe® endpoints, according to embodiments of the present disclosure.

FIG. 7 depicts a process for manually adding a DDC on a network fabric, according to embodiments of the present disclosure.

DETAILED DESCRIPTION OF EMBODIMENTS

Figure 1:
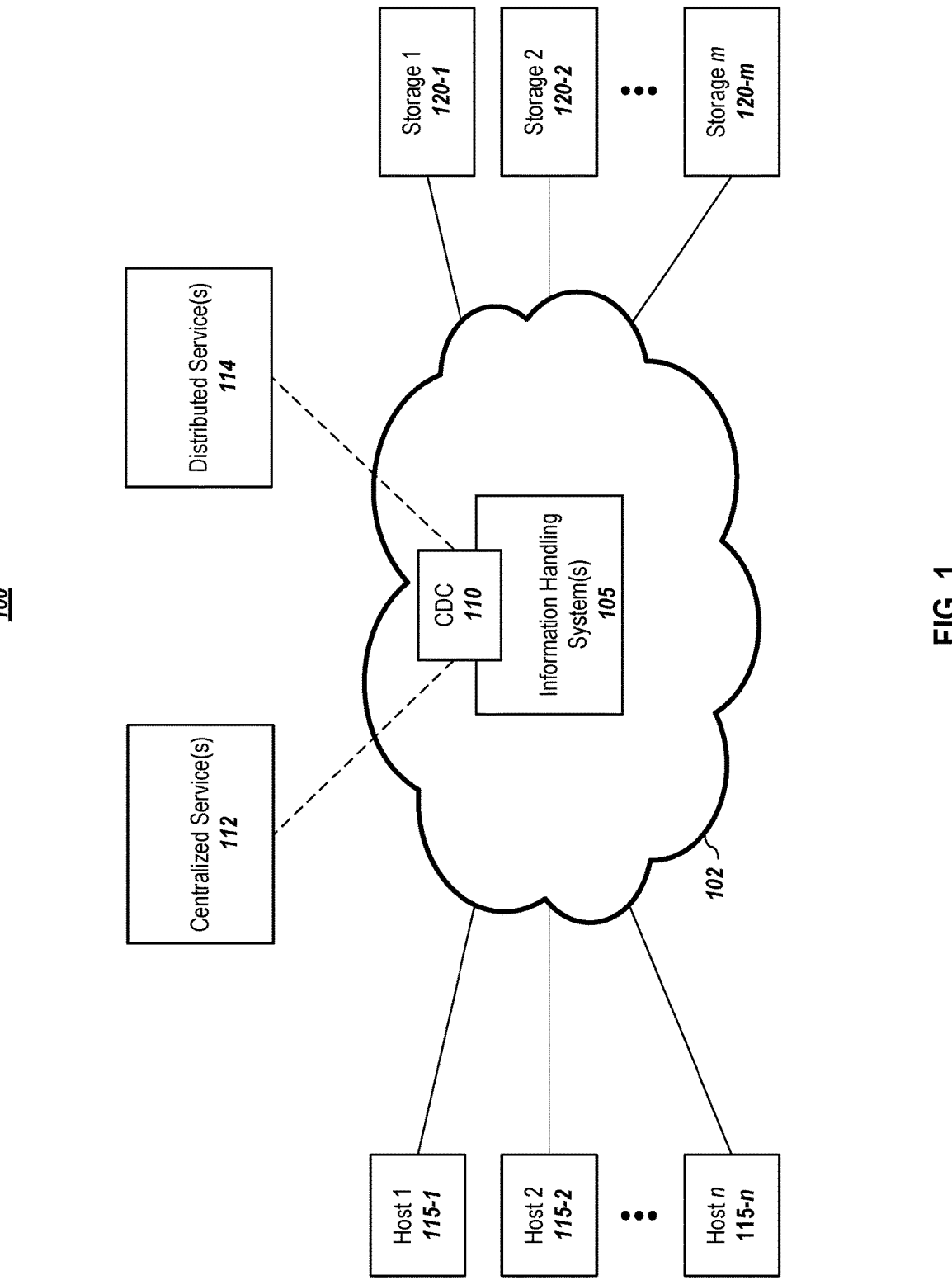
FIG. 1 depicts a network fabric with deployed CDC, according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," "comprising," and any of their variants shall be understood to be open terms, and any examples or lists of items are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

In one or more embodiments, a stop condition may include: (1) a set number of iterations have been performed; (2) an amount of processing time has been reached; (3) convergence (e.g., the difference between consecutive iterations is less than a first threshold value); (4) divergence (e.g., the performance deteriorates); and (5) an acceptable outcome has been reached.

It shall be noted that any experiments and results provided herein are provided by way of illustration and were performed under specific conditions using a specific embodiment or embodiments; accordingly, neither these experiments nor their results shall be used to limit the scope of the disclosure of the current patent document.

A. Embodiments of Network Fabric Deployed with Centralized Discovery Controller (CDC)

FIG. 1 depicts a network 102 with deployed CDC, according to embodiments of the present disclosure. The CDC 110 represents an entity that maintains the pertinent fabric information and provides a single or centralized management interface for control and management of the NVMe-oF™ network. In one or more embodiments, the CDC 110 may be placed in an information handling system 105, such as a switching network fabric, within the network 102 for various CDC services. Also depicted in FIG. 1 are hosts 115 and storage devices 120 that may be configured for access between the different devices.

In one or more embodiments, CDC may provide various connectivity broker services to host and subsystems. It connects to host and subsystems, fetches the information from each of these devices, and keeps them in a name server database, etc. The CDC may provide various functions or services, such as endpoint registration, endpoint query, name/zone services, notifications, database synchronization, etc.

In one or more embodiments, NVMe® hosts and subsystems register their information with CDC. A CDC Nameserver database may be updated with this information. The Nameserver database is maintained per CDC instance. A CDC instance may manage a set of hosts and subsystems that register with it. A CDC deployment may have one or more CDC instances running. Each CDC instance may be associated with a single NVMe® storage area network (SAN). A single NVMe® SAN may have one or more Internet Protocol (IP) networks. Devices on these IP networks may discover each other based on the zoning policies configured in using fabric orchestration or management services, such as SmartFabric Storage Software (SFSS) provided by Dell, Inc. of Round Rock, Texas.

In one or more embodiments, CDC may provide zoning services to enforce connectivity between the host & subsystem, and/or vice-versa, based on the zoning policies. In addition, discovery of new host/subsystem(s) may trigger notifications, e.g., asynchronous event notifications (AENs), about NVMe® endpoints about the change in connectivity. CDC may provide multicast Domain Name System (mDNS) services for service advertisement, such that an end host may automate the connectivity to the CDC. Furthermore, the CDC may provide user interfaces (UIs) for an administrator for CDC service management.

In one or more embodiments, CDC functionality may be divided into two categories, centralized service(s) 112 and distributed service(s) 114. Centralized services are CPU/memory intensive and need to be placed on switches which have high CPU/Memory capacity and have connectivity to the distributed services. Examples of centralized services may comprise, but not limited to, policy framework (e.g., zoning), monitoring and reporting, and/or user access to CDC, etc. Distributed services have lower CPU/memory requirements and may be horizontally scaled on lower powered switches. Distributed services are preferably placed closer to the endpoints. Examples of distributed services may comprise, but not limited to, NVMe® protocol termination, and transmission of discovery information (e.g., mDNS). Both exemplary distributed services may be directly associated with a number of connections to handle.

Embodiments of centralized service(s) and distributed services deployment on network switches are described in co-pending and commonly-owned U.S. Pat. No. 12,335,090, filed on 20 Jul. 2022 and issued 17 Jun. 2025, entitled "PLACEMENT OF CONTAINERIZED APPLICATIONS IN A NETWORK FOR EMBEDDED CENTRALIZED DISCOVERY CONTROLLER (CDC) DEPLOYMENT," which is incorporated by reference herein in its entirety.

In one or more embodiments, the centralized and/or distributed services deployed on network switches may comprise third-party applications. Embodiments of third-party applications on network switches are described in co-pending and commonly-owned U.S. Pat. No. 12,328,228, filed on 13 Jul. 2022 and issued on 10 Jun. 2025, entitled "SYSTEMS AND METHODS FOR DEPLOYING THIRD-PARTY APPLICATIONS ON A CLUSTER OF NETWORK SWITCHES," which is incorporated by reference herein in its entirety.

B. Embodiments of Push Registration on a Network Fabric for Endpoints

One of the services provided by the CDC is endpoint registration. In one or more embodiments, endpoints, such as NVMe® hosts and subsystems, may register their information with CDC. A CDC Nameserver database may be updated with this information. The Nameserver database may be maintained per CDC instances. Endpoint registration may be done via push registration and/or pull registration. In one or more embodiments, when the endpoint initiates the registration request with the CDC, it may be defined as a push registration. When the CDC initiates the registration request, it may be defined as a pull registration.

Figure 2:
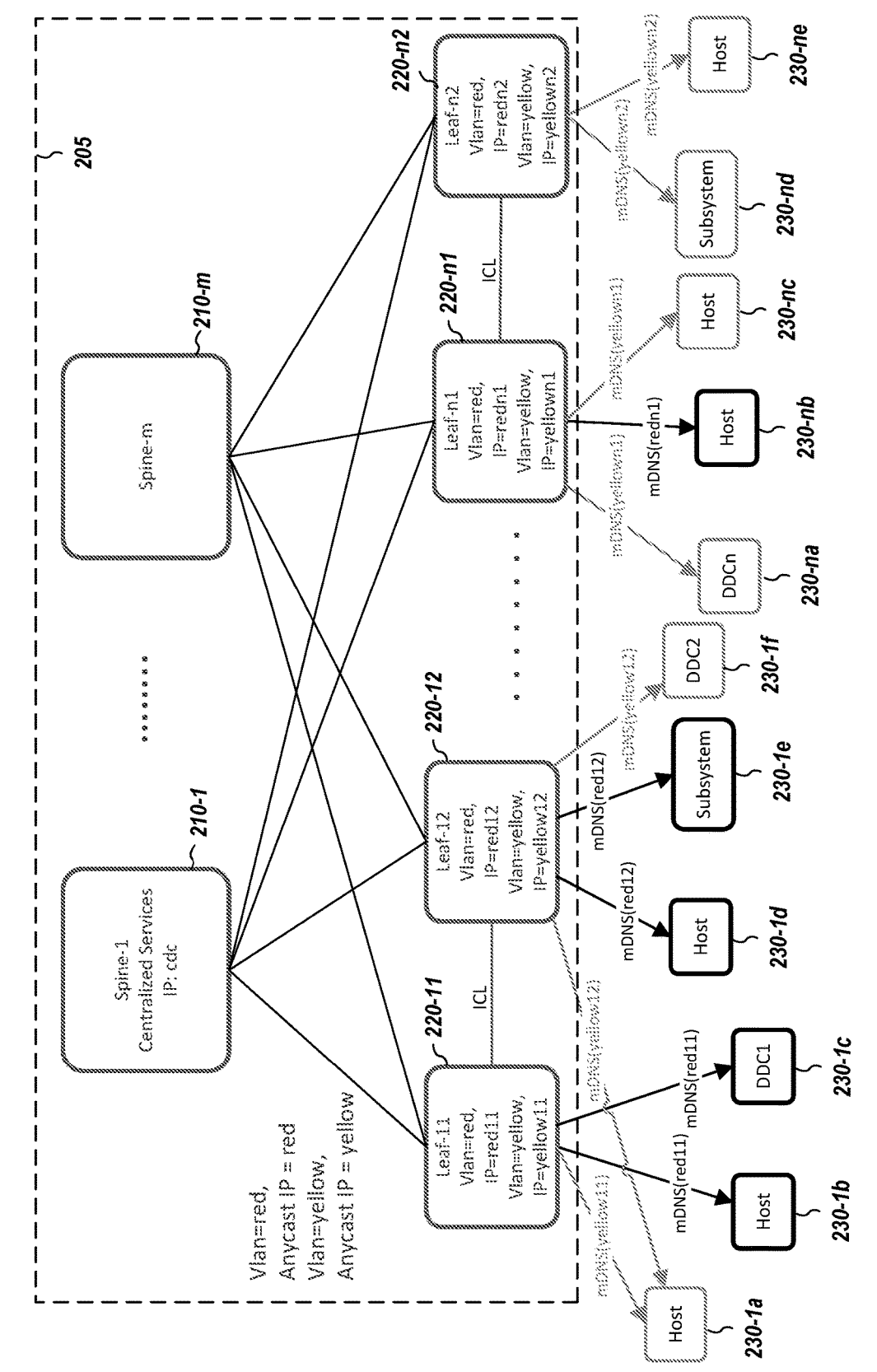
FIG. 2 depicts a schematic diagram for push registration on a network fabric for NVMe® endpoints, according to embodiments of the present disclosure.

FIG. 2 depicts a schematic diagram for push registration on a network fabric for NVMe® endpoints, according to embodiments of the present disclosure. The network fabric 205 may be a multistage switching network (e.g., a switching network with a CLOS topology) comprising a plurality of spine switches 210-1, . . . , 210-$m$, which communicatively couple to a plurality of leaf switches 220-11, . . . , 220-$n2$. One or more centralized services are deployed on a first spine switch 210-1, which has a global CDC IP address, e.g., IP:CDC as shown in FIG. 2. A plurality of distributed services may be deployed among the plurality of leaf switches.

In one or more embodiments, the plurality of leaf switches may be grouped into multiple leaf switch pairs with a fabric link—such as an inter-switch link (ISL), inter-chassis link (ICL), or inter-node link (INL), which terms may be used interchangeably—connecting the leaf switches in each pair. For example, the leaf switches 220-11 and 220-12 form one leaf switch pair with an ICL connecting the two leaf switches.

The plurality of spine switches and leaf switches provide configurable and dedicated communication paths for connections between endpoints 230, which may comprise multiple NVMe® hosts, e.g., 230-1$a$, 230-1$b$, 230-1$d$, etc., and multiple NVMe® subsystems, e.g., 230-1$e$, 230-$nd$, etc. The endpoints 230 may be grouped into multiple virtual local area networks (VLANs) and each leaf switch may be configured to have a local IP address for each VLAN. As shown in the exemplary embodiment in FIG. 2, the leaf switch 201-11 has a first local IP address "red11" for a first VLAN "red" and a second local IP "yellow11" for a second VLAN "yellow".

In one or more embodiments, the leaf switches may also communicatively couple to a plurality of direct discovery controllers (DDCs), e.g., 230-1$c$, 230-1$f$, etc., which may be NVMe® discovery controller residing on subsystems to provide controller functionality and at least some host functionality for pull registration. Details of the pull registration are described in the following Section C.

FIG. 3 depicts a process for push registration on a network fabric for NVMe® endpoints, according to embodiments of the present disclosure. In step 305, given a leaf switch deployed with one or more distributed services, the one or more distributed services advertise local IP addresses of the VLAN instead of global CDC IP via multicast Domain Name System (mDNS) messages to one or more endpoints connected to the leaf switch. For example, distributed service(s) operating on the leaf switches 220-11 may send out mDNS messages, e.g., yellow11 (under VLAN yellow) and red 11 (under VLAN red). In one or more embodiments, the CDC ensures that mDNS messages are not leaked to any fabric links. In other words, the mDNS messages are sent to endpoints connected to leaf switch ports without involving any fabric links, such as the ICL/ISL/INL. In other words, mDNS flows on intra-fabric links (ICL/ISL/INL) are restricted. Such a configuration ensures that endpoints receive mDNS message that have the closest local IP address. For example, as shown in FIG. 2, the host 230-1$a$ receives an mDNS message (yellow11) from the leaf switch 220-11, since the host 230-1$a$ is in a second VLAN (VLAN yellow); while the host 230-1$b$ receives an mDNS message (red11) from the leaf switch 220-11, since the host 230-1$b$ is in a first VLAN (VLAN red).

In one or more embodiments, an endpoint may receive mDNS messages from multiple leaf switches to form multihoming paths. For example, the host 230-1$a$ receives an mDNS message (yellow11) from the leaf switch-11 and an mDNS message (yellow12) from the leaf switch-12. As a result, the host 230-1$a$ may send connection requests to both leaf switches (switch-11 and switch-12) and have multihoming paths to the CDC centralized service(s) deployed on the spine switch 210-1.

In step 310, the CDC may start listener services on the leaf switch (and also on other leaf switches deployed with distributed services) to serve any incoming NVMe® connection requests for the local IP addresses on the leaf switch. In step 315, the one or more endpoints send connection requests for registration based on the mDNS message received. In step 320, the leaf switch receives the connection requests from the one or more endpoints to complete push registration for the one or more endpoints.

In one or more embodiments, such a push registration process guarantees a connection request from an endpoint is served by a local switch. Therefore, a predictable behavior with respect to connection scale, delay, and jitter may be achieved.

C. Embodiments of Pull Registration on a Network Fabric for Endpoints

A pull registration is a registration process with registration request initiated by the CDC. In one or more embodiments, a pull registration process may comprise configuring a Direct Discovery Controller (DDC) for each subsystem endpoint that the CDC manages. Each DDC may couple to one or more subsystems for registration, while one subsystem may only have one DDC for registration. During the pull registration, the CDC may query the DDC for a subsystem and register the subsystem.

Figure 4:
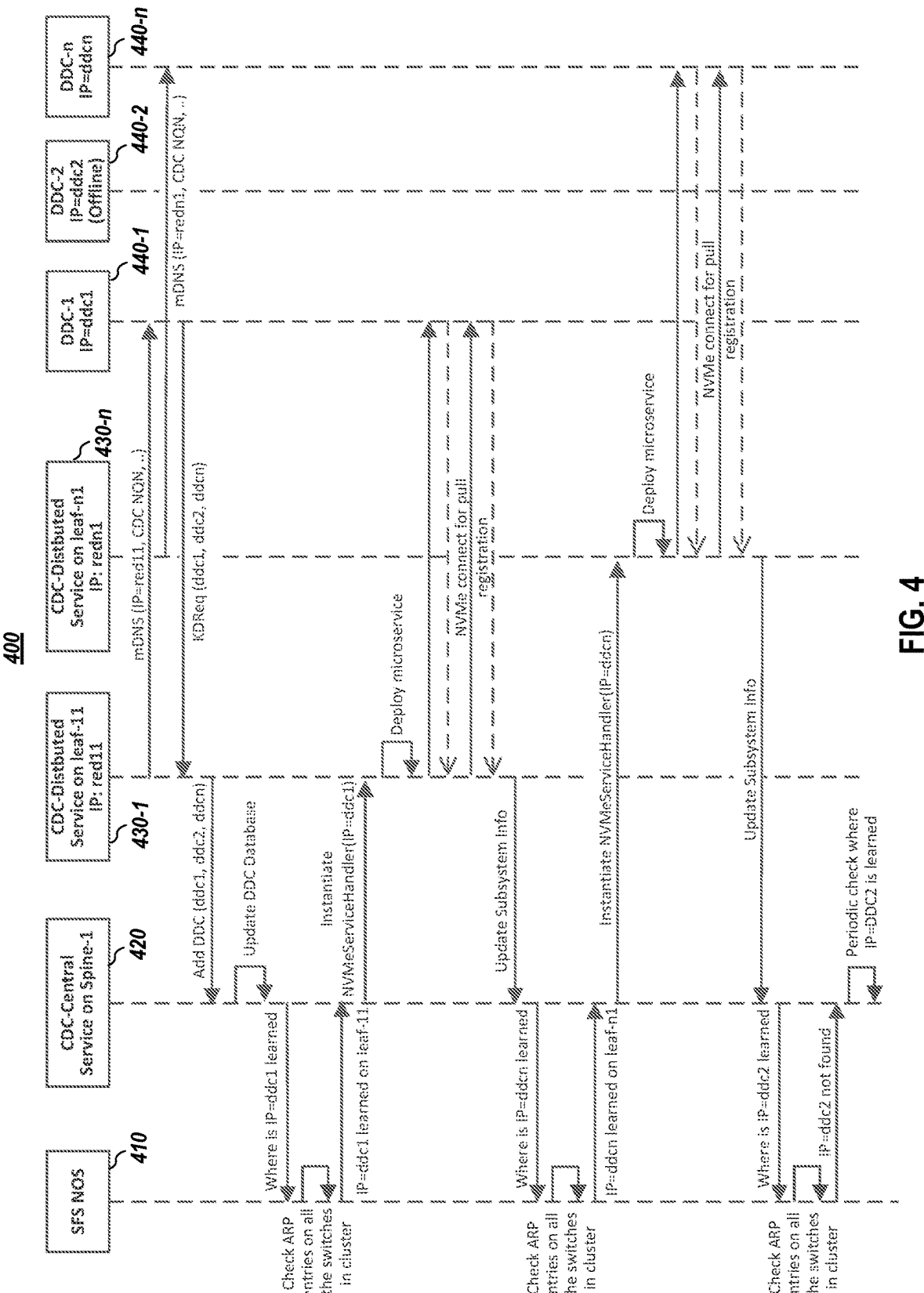
FIG. 4 depicts a schematic diagram for pull registration on a network fabric for NVMe® endpoints, according to embodiments of the present disclosure.

FIG. 4 depicts a schematic diagram for pull registration on a network fabric for NVMe® endpoints, according to embodiments of the present disclosure. The pull registration processing may be implemented using a Networking Operating System (NOS) 410 involving the CDC central service 420 deployed on a spine switch, CDC distributed services 430 deployed among different leaf switches, and one or more DDCs 440. In one or more embodiments, the NOS 410 may comprise networking orchestration and clustering, such as SmartFabric Services (SFS) provided by Dell, Inc. of Round Rock, Texas, such that data center networking fabrics may be quickly and easily deployed and automated.

FIG. 5 depicts a process for pull registration on a network fabric for NVMe® endpoints, according to embodiments of the present disclosure. One or more steps in FIG. 5 may correspond to flows graphically described in FIG. 4. In step 505, the CDC distributed services deployed on the leaf switches send mDNS messages to corresponding DDCs. Each mDNS message may comprise a local IP address of the leaf switch (such as red11) and a CDC NVMe® Qualified Name (NQN), which is used to identify a CDC instance. In step 510, responsive to a CDC distributed service (e.g., 430-1 or 430-*n*) receiving from a corresponding DDC (440-1 or 440-*n*) a response, e.g., a kickstart discovery request (KDReq) comprising one or more DDC IP addresses (e.g., ddc1, ddc2, ddcn), the CDC distributed service sends a request for adding the corresponding DDC to the CDC centralized service.

In step 515, the CDC centralized service updates a DDC database and sends an inquiry to the NOS regarding which switch to learn the DDC IP address (e.g., IP=ddc1 or ddcn). In step 520, the NOS checks Address Resolution Protocol (ARP) entries on all leaf switches to determine a leaf switch (e.g., leaf-11 or leaf-n1) to learn the local address of the corresponding DDC. In the exemplary embodiment in FIG. 4, when the KDReq is sent from the DDC 440-1 and received at the leaf switch leaf-11, the leaf switch leaf-11 is determined to learn the DDC IP address (IP=ddc1 or ddcn). During the checking, based at least on network fabric topology, the NOS may scan the IP addresses on leaf switches, specifically the leaf switches connected to workloads, and look for a match. If the DDC IP address is found on at least one leaf switch, the switch to which the DDC IP address is directly learned on endpoint-switch connection interface (e.g., switch port) is determined as the leaf switch to learn the local address of the corresponding DDC. In one or more embodiments, SFSS of SFSS-like service may track the ports which are directly connected to an endpoint instead of the ports which are connected to the fabric.

In step 525, upon receiving the determined leaf switch (leaf-11 or leaf-n1) from the NOS, the CDC centralized service instantiates an NVMe® service handler (NVMeServiceHandler, as shown in FIG. 4) to deploy a microservice on the determined leaf switch (leaf-11). The microservice may be a container to serve NVMe® communications with an NVMe® endpoint (e.g., an NVMe® subsystem) to which the corresponding DDC interfaces. The container may also be responsible for further NVMe® communications. In one or more embodiments, when the container detects a loss of connectivity with the NVMe® endpoint, it reports the loss of connectivity to the CDC centralized service. The centralized service may kill the container on the determined switch, perform the above steps to find a new leaf switch to which the NVMe® endpoint has moved, and instantiate a new container on the new leaf switch. Such a mechanism ensures that at any time, an endpoint may be served from the closest leaf switch.

In step 530, upon microservice deployment, the determined leaf switch (leaf-11) sends an NVMe® connection request to the corresponding DDC to complete a pull registration for the corresponding DDC. In step 535, the CDC distributed services on the determined leaf switch (leaf-11) send the pull registration completion information of the corresponding DDC to the CDC centralized service for system information update.

In one or more embodiments, if a DDC IP address (e.g., ddc2) is not found, possibly due to the corresponding DDC (DDC-2) being offline, an ARP request may be originated from each of multiple leaf switches for the given IP address (e.g., ddc2). If an NVMe® endpoint for the given IP address is connected to one leaf switch, the NVMe® endpoint replies to the ARP request, and the SFSS/SFSS-like service learns the IP address on the one switch. In case the DDC IP address is not learned from any leaf switches, periodic ARP requests may be sent for the given IP address until a predetermined number, a predetermined time interval, or the given IP address is resolved.

In one or more embodiments, when a DDC reports multiple kickstart records or KDReqs, the CDC may implement pull registration to find a subsystem corresponding to each KDReq. Embodiments of kickstart and pull registration are described in co-pending and commonly-owned U.S. patent application Ser. No. 17/239,462, filed on 23 Apr. 2021, and in co-pending and commonly-owned U.S. patent application Ser. No. 17/200,896, filed on 14 Mar. 2021. Each of the aforementioned patent documents is incorporated by reference herein in its entirety.

D. Embodiments of Manually Adding DDC

In one or more embodiments, a DDC may be manually added via a CDC user interface (UI) for a subsystem that does not yet have automated registration. The CDC UI may be a graphical user interface (GUI) or a web UI. The CDC may use the manual mechanism to find where the subsystem endpoint is connected.

Figure 6:
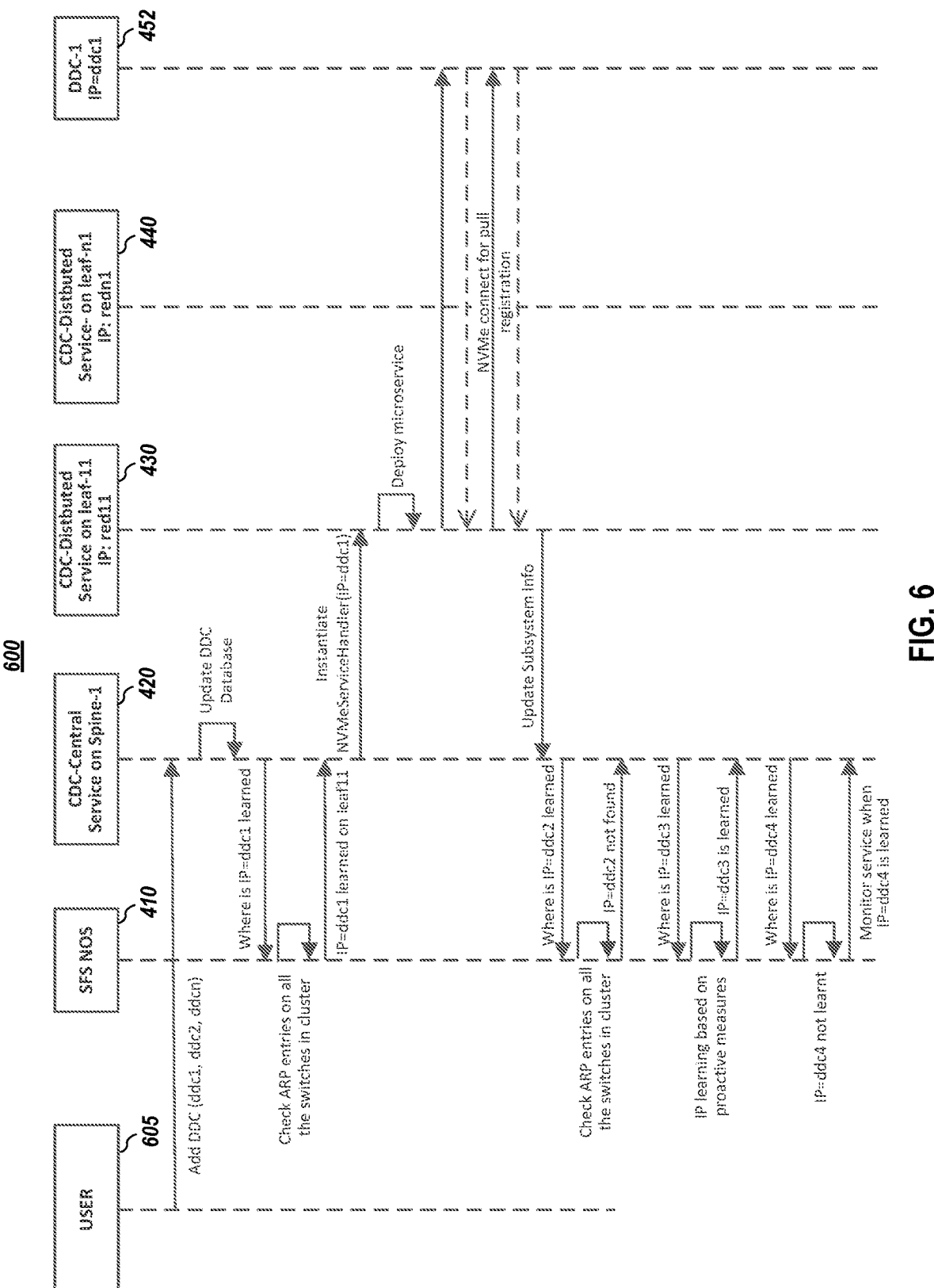
FIG. 6 depicts a schematic diagram for manually adding a direct discovery controller (DDC) on a network fabric, according to embodiments of the present disclosure.

FIG. 6 and FIG. 7 respectively depict a schematic diagram and a process for manually adding a DDC on a network fabric, according to embodiments of the present disclosure. In step 705, the CDC centralized service deployed on the spine switch updates a DDC database based on one or more DDCs manually added by a user via a CDC UI. Each of the one or more added DDCs has a corresponding DDC IP address, such as ddc1, ddc2, etc.

In step 705, the CDC centralized service updates a DDC database based on one or more DDCs manually added by a user 605 via a CDC UI (e.g., a GUI). Each DDC has a DDC IP address.

In step 710, the CDC centralized service sends an inquiry to the NOS regarding which switch to learn a DDC IP address (e.g., IP=ddc1) for one added DDC (e.g., DDC-1). In step 715, the NOS checks one or more ARP entries on leaf switches to determine a leaf switch (e.g., leaf-11) to learn the local address of the one added DDC. Since the DDC IP address (e.g., ddc1) never communicated with CDC, the ARP entry may not be present, and the DDC IP address may not be resolved on any of the switches at least initially. In one or more embodiments, the NOS may send a ping request to each of the leaf switches for IP=ddc1. After sending the ping request to each leaf switch, the leaf switch (e.g., leaf-11) that is connected to the one added DDC (DDC-1) sends a response for the ping and therefore an ARP entry may be added to the leaf switch. Accordingly, the SFS/SFS-like services solve the ARP on the leaf switch (leaf-11). In other words, the DDC IP address (ddc1) is learned on the determined leaf switch.

In step 720, upon receiving the determined leaf switch (leaf-11) from the NOS, the CDC centralized service instantiates an NVMe® service handler (NVMeServiceHandler, as shown in FIG. 6) to deploy microservice on the determined leaf switch (leaf-11). The microservice may be a container to serve NVMe® communications to the one added DDC (DDC-1).

In step 725, upon microservice deployment, the determined leaf switch (leaf-11) sends an NVMe® connection request to the one added DDC to complete a pull registration for the added DDC. In step 730, the CDC distributed services on the determined leaf switch (leaf-11) send pull registration completion information to the CDC centralized service for system information update.

In one or more embodiments, if a DDC IP address (e.g., ddc2) is not found, possibly due to the corresponding DDC (DDC-2) being offline, the ARP for ddc2 will not be resolved on any of the switches initially. SFS may send a ping request from each of the switches for DDC IP address (e.g., ddc2) and waits for a response for a predetermined timeout. If no response is received after the predetermined timeout, the SFS sends a message to the CDC centralized service indicating no IP found. The CDC centralized service may re-send the inquiry for the DDC IP address (ddc2) periodically.

In one or more embodiments, when the CDC centralized service sends an inquiry to the NOS regarding which switch to learn a DDC IP address (e.g., IP=ddc3), the DDC IP address (ddc3) may be learned on the NOS based on proactive measures.

In one or more embodiments, when the CDC centralized service sends an inquiry to the NOS regarding which switch to learn a DDC IP address (e.g., IP=ddc4), the NOS may not learn the DDC IP address (ddc4). However, the NOS may monitor services, e.g., CDC centralized services, when the DDC IP address (ddc4) is learned.

Figure 8:
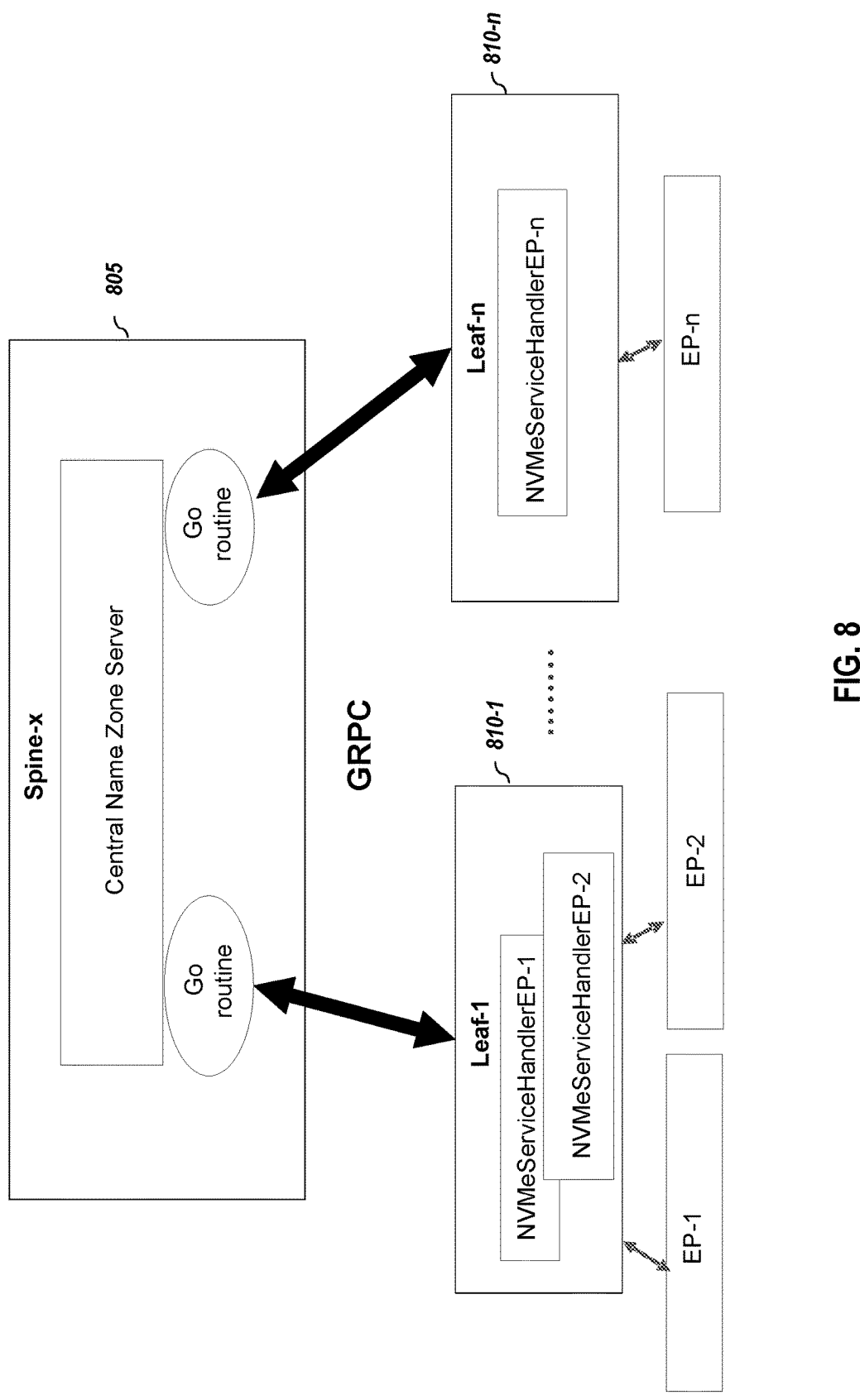
FIG. 8 depicts a schematic diagram with services placed on a network fabric close NVMe® endpoints, according to embodiments of the present disclosure.

FIG. 8 depicts a schematic diagram with services placed on a network fabric close to NVMe® endpoints, according to embodiments of the present disclosure. CDC centralized service, such as zone server, is placed on a spine switch, which couples to a plurality of leaf switches 810. Various distributed services are placed on the leaf switches close to endpoints to be served by the CDC distributed services. For example, the service "NVMeServiceHandlerEP-1" serving endpoint 1 (EP-1) and "NVMeServiceHandlerEP-2" serving endpoint 2 (EP-2) are placed on the leaf switch 810-1, to which the EP-1 and EP-2 are connected. The service "NVMeServiceHandlerEPn" serving endpoint n (EP-n) is placed on the leaf switch 810-n, to which the EP-n is connected. The CDC centralized service may communicate to the distributed services via a Remote Procedure Call (RPC) framework, e.g., GPRC, for connecting multiple services in various environments. The GPRC is an open-source RPC framework that may run in various environments such that a client application may directly call a method on a server application on a different machine as if it were a local object, making it easier to create distributed applications and services.

The embodiments of placement of services close to endpoints ensure a predictable behavior with respect to connection scale, delay, and jitter, especially for switches having resource-constrained compute resources.

E. System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smartphone, phablet, tablet, etc.), smartwatch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read-only memory (ROM), and/or other types of memory. Additional components of the computing system may include one or more drives (e.g., hard disk drives, solid-state drive, or both), one or more network ports for communicating with external devices as well as various input and output (I/O) devices. The computing system may also include one or more buses operable to transmit communications between the various hardware components.

Figure 9:
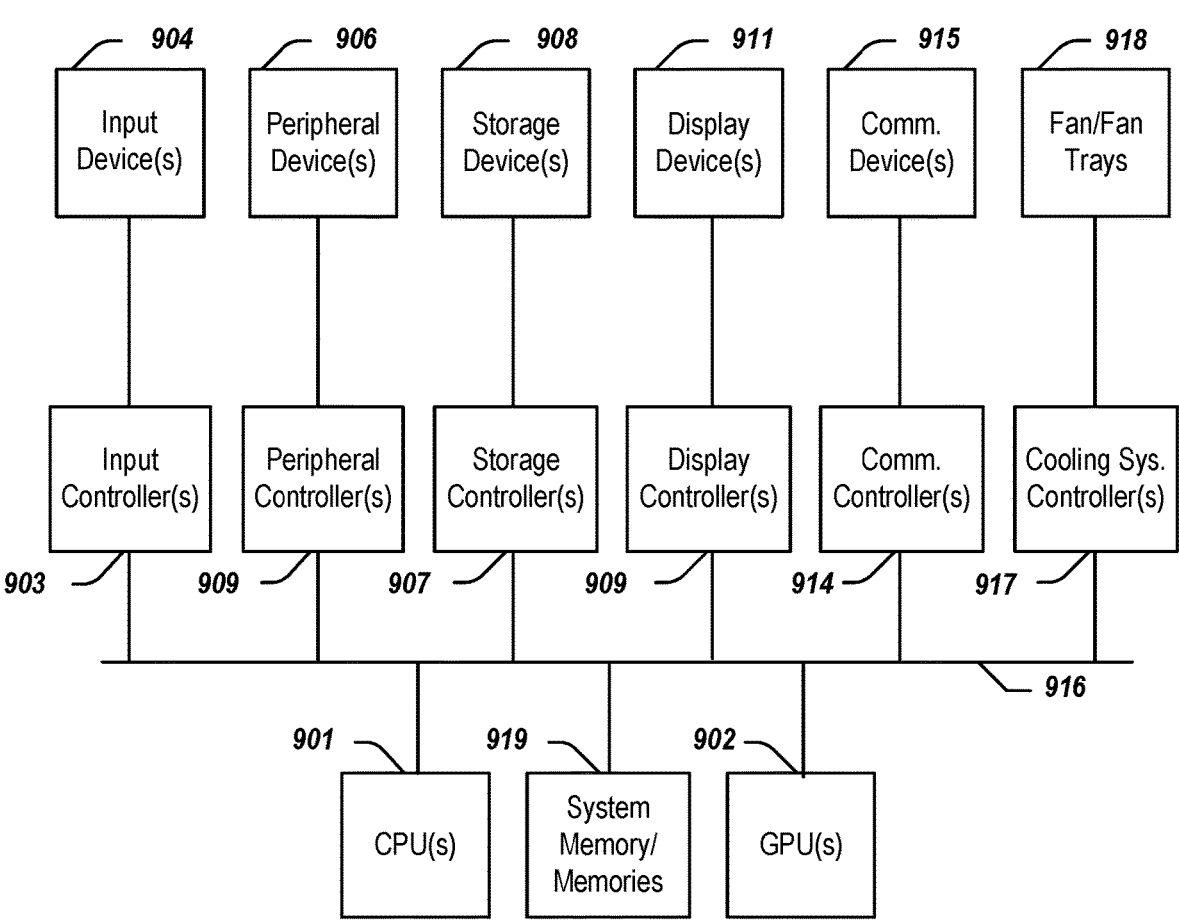
FIG. 9 depicts a simplified block diagram of an information handling system, according to embodiments of the present disclosure.

FIG. 9 depicts a simplified block diagram of an information handling system (or computing system), according to embodiments of the present disclosure. It will be understood that the functionalities shown for system 900 may operate to support various embodiments of a computing system—although it shall be understood that a computing system may be differently configured and include different components, including having fewer or more components as depicted in FIG. 9.

As illustrated in FIG. 9, the computing system 900 includes one or more CPUs 901 that provides computing resources and controls the computer. CPU 901 may be implemented with a microprocessor or the like and may also include one or more graphics processing units (GPU) 902 and/or a floating-point coprocessor for mathematical computations. In one or more embodiments, one or more GPUs 902 may be incorporated within the display controller 909, such as part of a graphics card or cards. The system 900 may also include a system memory 919, which may comprise RAM, ROM, or both.

A number of controllers and peripheral devices may also be provided, as shown in FIG. 9. An input controller 903 represents an interface to various input device(s) 904, such as a keyboard, mouse, touchscreen, stylus, microphone, camera, trackpad, display, etc. The computing system 900 may also include a storage controller 907 for interfacing with one or more storage devices 908 each of which includes a storage medium such as magnetic tape or disk, or an optical medium that might be used to record programs of instructions for operating systems, utilities, and applications, which may include embodiments of programs that implement various aspects of the present disclosure. Storage device(s) 908 may also be used to store processed data or data to be processed in accordance with the disclosure. The system 900 may also include a display controller 909 for providing an interface to a display device 911, which may be a cathode ray tube (CRT) display, a thin film transistor (TFT) display, organic light-emitting diode, electroluminescent panel, plasma panel, or any other type of display. The computing system 900 may also include one or more peripheral controllers or interfaces 905 for one or more peripherals 906. Examples of peripherals may include one or more printers, scanners, input devices, output devices, sensors, and the like. A communications controller 914 may interface with one or more communication devices 915, which enables the system 900 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 900 comprises one or more fans or fan trays 918 and a cooling subsystem controller or controllers 917 that monitors thermal temperature(s) of the system 900 (or components thereof) and operates the fans/fan trays 918 to help regulate the temperature.

In the illustrated system, all major system components may connect to a bus 916, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Figure 10:
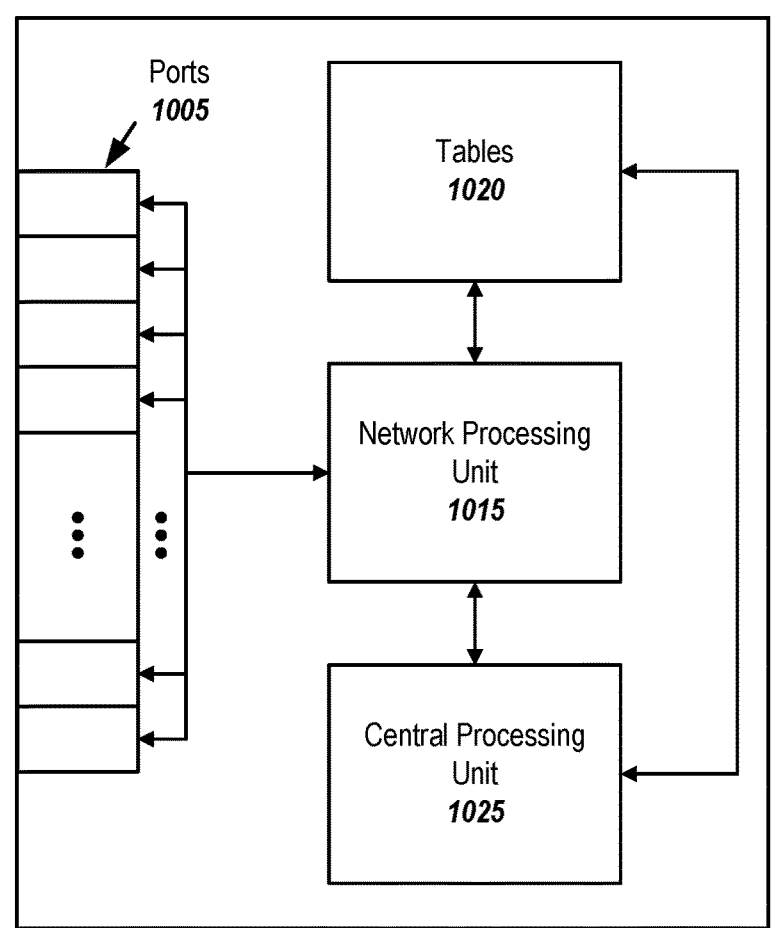
FIG. 10 depicts an alternative block diagram of an information handling system, according to embodiments of the present disclosure.

FIG. 10 depicts an alternative block diagram of an information handling system, according to embodiments of the present disclosure. It will be understood that the functionalities shown for system 1000 may operate to support various embodiments of the present disclosure—although it shall be understood that such system may be differently configured and include different components, additional components, or fewer components.

The information handling system 1000 may include a plurality of I/O ports 1005, a network processing unit (NPU) 1015, one or more tables 1020, and a CPU 1025. The system includes a power supply (not shown) and may also include other components, which are not shown for sake of simplicity.

In one or more embodiments, the I/O ports 1005 may be connected via one or more cables to one or more other network devices or clients. The network processing unit 1015 may use information included in the network data received at the node 1000, as well as information stored in the tables 1020, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as compact discs (CDs) and holographic devices; magneto-optical media; and hardware devices that are specially configured to store or to store and execute program code, such as ASICs, PLDs, flash memory devices, other non-volatile memory devices (such as 3D XPoint-based devices), ROM, and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize that no computing system or programming language is critical to the practice of the present disclosure. One skilled in the art will also recognize that a number of the elements described above may be physically and/or functionally separated into modules and/or sub-modules or combined together.

It will be appreciated by those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claim or claims may be arranged differently, including having multiple dependencies, configurations, and combinations.

What is claimed is:

1. A method for placement of services in a network fabric, the method comprising:

given the network fabric comprising multiple spine switches and multiple leaf switches with a centralized service deployed on at least one spine switch of the multiple spine switches and a plurality of distributed services deployed at one or more of the leaf switches, implementing pull registration for one or more endpoints of the network fabric by performing steps comprising:

sending, from the plurality of distributed services deployed among the multiple leaf switches, multicast Domain Name System (mDNS) messages to corresponding direct discovery controllers (DDCs);

responsive to a distributed service receiving a response from a corresponding DDC, sending from the distributed service to the centralized service a request for adding the corresponding DDC, the response comprising a DDC internet protocol (IP) address of the corresponding DDC;

updating, by the centralized service, a DDC database and sending, from the centralized service, an inquiry to a networking operating system (NOS) of the network fabric regarding the DDC IP address;

checking, by the NOS, one or more Address Resolution Protocol (ARP) entries related to one or more leaf switches of a set of leaf switches to determine a leaf switch wherein the DDC IP address is associated;

instantiating, by the centralized service, a non-volatile memory express (NVMe) service handler to deploy a microservice on the determined leaf switch; and upon microservice deployment, sending, from the determined leaf switch, an NVMe connection request to the corresponding DDC to complete pull registration for the corresponding DDC.

2. The method of claim 1 further comprising:

sending, from the determined leaf switch, pull registration completion information of the corresponding DDC to the centralized service for system information update.

3. The method of claim 1 wherein the response from the corresponding DDC is a kickstart discovery request (KDReq) comprising one or more DDC IP addresses.

4. The method of claim 1 wherein the step of checking, by the NOS, one or more Address Resolution Protocol (ARP) entries related to one or more leaf switches of a set of leaf switches to determine a leaf switch wherein the DDC IP address is associated comprises:

scanning, by the NOS, one or more IP addresses on at least one or more of the leaf switches for a match to the DDC IP address; and responsive to the DDC IP address being found on at least one leaf switch, identifying the leaf switch that is the leaf switch most directly connected to the DDC IP address via a switch port of the leaf switch as the determined leaf switch.

5. The method of claim 1 wherein the microservice is a container to serve NVMe communications with an NVMe endpoint to which the corresponding DDC interfaces.

6. The method of claim 5 further comprising:

responsive to the container detecting a loss of connectivity with the NVMe endpoint, reporting, by the container, the loss of connectivity to the centralized service;

killing, by the centralized service, the container on the determined switch;

finding a new leaf switch to which the NVMe endpoint has moved; and instantiating a new container on the new leaf switch.

7. The method of claim 1 further comprising:

responsive to one DDC IP address not being found, originating an ARP request from each of the multiple leaf switches for the one DDC IP address;

responsive to an NVMe endpoint for the one DDC IP address being connected to one leaf switch, replying from the NVMe endpoint to the ARP request; and associating the one DDC IP address with the one leaf switch.

8. The method of claim 7 further comprising:

responsive to the one DDC IP address not found from any leaf switches, sending one or more ARP requests for the one DDC IP address until a predetermined number is reached, a predetermined time interval has elapsed, or the given IP address is resolved.

9. A system comprising:

a network fabric comprising one or more spine switches and multiple leaf switches with a centralized service deployed on at least one spine switch and a plurality of distributed services deployed at one or more of the leaf switches, implementing registration for one or more endpoints of the network fabric, wherein one or more of the spine switches, one or more of the leaf switches, or a combination thereof perform steps comprising:

sending, from the plurality of distributed services deployed among the multiple leaf switches, multicast Domain Name System (mDNS) messages to corresponding direct discovery controllers (DDCs);

responsive to a distributed service receiving a response from a corresponding DDC, sending from the distributed service to the centralized service a request for adding the corresponding DDC, the response comprises a DDC internet protocol (IP) address of the corresponding DDC;

updating, by the centralized service, a DDC database and sending, from the centralized service, an inquiry to a networking operating system (NOS) of the network fabric regarding the DDC IP address;

checking, by the NOS, one or more Address Resolution Protocol (ARP) entries related to one or more leaf switches of a set of leaf switches to determine a leaf switch wherein the DDC IP address is associated;

instantiating, by the centralized service, a non-volatile memory express (NVMe) service handler to deploy a microservice on the determined leaf switch; and upon microservice deployment, sending, from the determined leaf switch, an NVMe connection request to the corresponding DDC to complete pull registration for the corresponding DDC.

10. The system of claim 9 wherein one or more of the spine switches, one or more of the leaf switches, or a combination thereof further perform steps comprising:

sending, from the determined leaf switch, pull registration completion information of the corresponding DDC to the centralized service for system information update.

11. The system of claim 9 wherein the step of checking, by the NOS, one or more Address Resolution Protocol (ARP) entries related to one or more leaf switches of a set of leaf switches to determine a leaf switch wherein the DDC IP address is associated comprises:

scanning, by the NOS, one or more IP addresses on at least one or more of the leaf switches for a match to the DDC IP address; and responsive to the DDC IP address being found on at least one leaf switch, identifying the leaf switch that is the leaf switch most directly connected to the DDC IP address via a switch port of the leaf switch as the determined leaf switch.

12. The system of claim 9 wherein the microservice is a container to serve NVMe communications with an NVMe endpoint to which the corresponding DDC interfaces.

13. The system of claim 12 wherein one or more of the spine switches, one or more of the leaf switches, or a combination thereof further perform steps comprising:

responsive to the container detecting a loss of connectivity with the NVMe endpoint, reporting, by the container, the loss of connectivity to the centralized service;

killing, by the centralized service, the container on the determined switch;

finding a new leaf switch to which the NVMe endpoint has moved; and instantiating a new container on the new leaf switch.

14. The system of claim 9 wherein one or more of the spine switches, one or more of the leaf switches, or a combination thereof further perform steps comprising:

responsive to one DDC IP address not being found, originating an ARP request from each of the multiple leaf switches for the one DDC IP address;

responsive to an NVMe endpoint for the one DDC IP address being connected to one leaf switch, replying from the NVMe endpoint to the ARP request; and associating the one DDC IP address with the one leaf switch.

15. The system of claim 14 wherein one or more of the spine switches, one or more of the leaf switches, or a combination thereof further perform steps comprising:

responsive to the one DDC IP address not found from any leaf switches, sending one or more ARP requests for the one DDC IP address until a predetermined number is reached, a predetermined time interval has elapsed, or the given IP address is resolved.

16. One or more non-transitory computer-readable media comprising one or more sequences of instructions which, when executed by at least one processor, given a network fabric comprising one or more spine switches and multiple leaf switches with a centralized service deployed on at least one spine switch and a plurality of distributed services deployed at one or more of the leaf switches, causes steps to be performed comprising:

sending, from the plurality of distributed services deployed among the multiple leaf switches, multicast Domain Name System (mDNS) messages to corresponding direct discovery controllers (DDCs);

responsive to a distributed service receiving a response from a corresponding DDC, sending from the distributed service to the centralized service a request for adding the corresponding DDC, the response comprises a DDC internet protocol (IP) address of the corresponding DDC;

updating, by the centralized service, a DDC database and sending, from the centralized service, an inquiry to a networking operating system (NOS) of the network fabric regarding the DDC IP address;

checking, by the NOS, one or more Address Resolution Protocol (ARP) entries related to one or more leaf switches of a set of leaf switches to determine a leaf switch wherein the DDC IP address is associated;

instantiating, by the centralized service, a non-volatile memory express (NVMe) service handler to deploy a microservice on the determined leaf switch; and upon microservice deployment, sending, from the determined leaf switch, an NVMe connection request to the corresponding DDC to complete pull registration for the corresponding DDC.

17. The one or more non-transitory computer-readable media of claim 16 wherein the step of checking, by the NOS, one or more Address Resolution Protocol (ARP) entries related to one or more leaf switches of a set of leaf switches to determine a leaf switch wherein the DDC IP address is associated comprises:

scanning, by the NOS, one or more IP addresses on at least one or more of the leaf switches for a match to the DDC IP address; and responsive to the DDC IP address being found on at least one leaf switch, identifying the leaf switch that is the leaf switch most directly connected to the DDC IP address via a switch port of the leaf switch as the determined leaf switch.

18. The one or more non-transitory computer-readable media of claim 16 wherein the microservice is a container to serve NVMe communications with an NVMe endpoint to which the corresponding DDC interfaces.

19. The one or more non-transitory computer-readable media of claim 18 further comprising one or more sequences of instructions which, when executed by at least one processor, causes steps to be performed comprising:

responsive to the container detecting a loss of connectivity with the NVMe endpoint, reporting, by the container, the loss of connectivity to the centralized service;

killing, by the centralized service, the container on the determined switch;

finding a new leaf switch to which the NVMe endpoint has moved; and instantiating a new container on the new leaf switch.

20. The one or more non-transitory computer-readable media of claim 16 further comprising one or more sequences of instructions which, when executed by at least one processor, causes steps to be performed comprising:

responsive to one DDC IP address not being found, originating an ARP request from each of the multiple leaf switches for the one DDC IP address;

responsive to an NVMe endpoint for the one DDC IP address being connected to one leaf switch, replying from the NVMe endpoint to the ARP request; and associating the one DDC IP address with the one leaf switch.

* * * * *